United States Patent [19]

Poirier

[11] 4,192,410
[45] Mar. 11, 1980

[54] GEARBOX COMPRISING MEANS FOR BRAKING THE INPUT SHAFT FOR ENGAGING A NON-SYNCHRONIZED SPEED

[75] Inventor: Daniel Poirier, La Garenne Colombes, France

[73] Assignee: Automobiles Peugeot, Paris, France

[21] Appl. No.: 863,252

[22] Filed: Dec. 22, 1977

[30] Foreign Application Priority Data

Jan. 19, 1977 [FR] France ................ 77 01447

[51] Int. Cl.² .............................................. B60K 41/26
[52] U.S. Cl. ..................................... 192/4 A; 74/339; 74/411.5; 192/4 C
[58] Field of Search .............. 74/339, 411.5; 192/4 A, 192/4 C

[56] References Cited

U.S. PATENT DOCUMENTS

| | | | |
|---|---|---|---|
| 1,784,354 | 12/1930 | Haussmann | 192/4 C |
| 2,242,026 | 5/1941 | Fishborn | 74/339 |
| 2,342,985 | 2/1944 | Tyken et al. | 192/4 A |
| 2,993,574 | 7/1961 | Gardner | 192/4 A |
| 3,545,295 | 12/1970 | Ravello | 74/339 |
| 4,016,773 | 4/1977 | Galas et al. | 74/339 |

Primary Examiner—Allan D. Herrmann
Attorney, Agent, or Firm—Burns, Doane, Swecker & Mathis

[57] ABSTRACT

The gear members of the non-synchronized gear unit of the gearbox are engaged by a gear selecting and engaging device which also drives a sliding member which is adapted to shift a lever. The lever has a braking surface which is engageable with the input shaft of the gearbox to brake the input shaft. When the gear members are in process of being brought into mutual engagement by the selecting and engaging device, the latter shifts the sliding member to an intermediate position in which the sliding member puts the lever in a position in which the braking surface engages and brakes the input shaft before the gear members have contacted each other. The selecting and engaging device, in continuing its action, finally puts the two gear members in mutual engagement and at the same time puts the intermediate member in a position in which it puts the lever in the position for disengaging the braking surface from the input shaft. In this way, upon engagement of the non-synchronized gear unit teeth noise is avoided.

8 Claims, 5 Drawing Figures

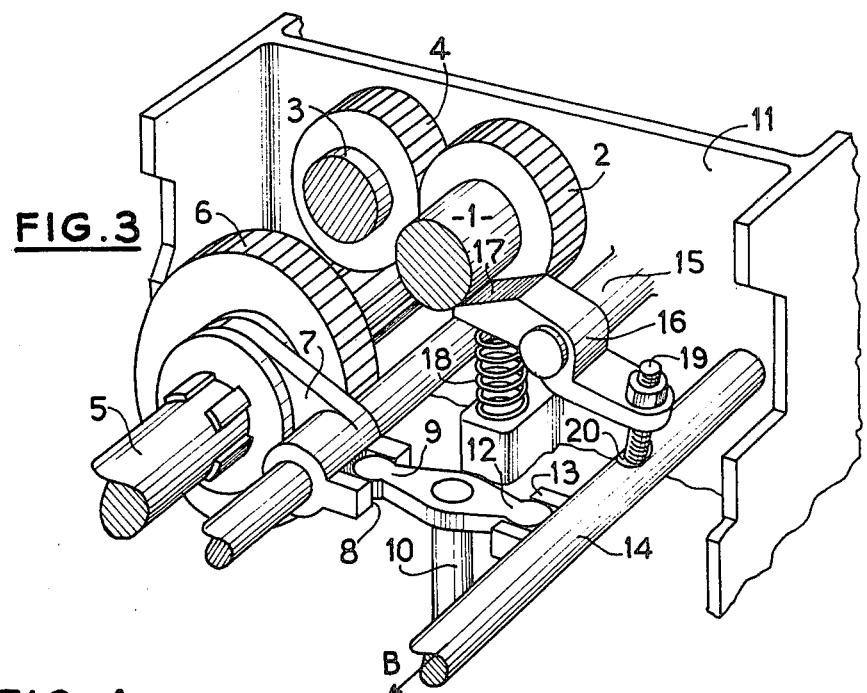
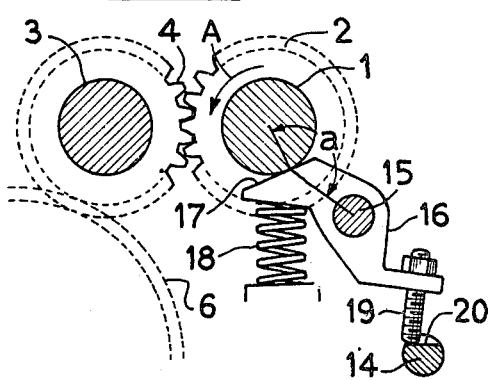
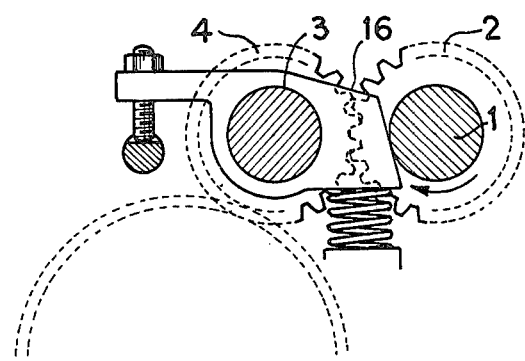

GEARBOX COMPRISING MEANS FOR BRAKING THE INPUT SHAFT FOR ENGAGING A NON-SYNCHRONIZED SPEED

The present invention relates to manually-controlled gearboxes for automobile vehicles comprising at least one non-synchronized speed or ratio, usually that of reverse speed. It is known that in such gearboxes teeth noise is heard, even when the vehicle is stationary, upon the mutual engagement of the toothed members pertaining to the non-synchronized speed when the input moving part of the gearbox is still rotating under the effect of inertia or a parasitic driving effect.

In order to overcome these drawbacks, devices have been proposed for immobilizing the driving part of the mechanism before the engagement of the non-synchronized speed, by a braking effect achieved by the actuation of a synchronizer associated with another speed or ratio of the gearbox. These known devices unfortunately depend on the rating of the various springs employed, which complicates manufacture and is liable to adversely affect the reliability of the devices over a period of time. The provision of a brake shoe has also been proposed (first Addition No. 86,109 to French Pat. No. 1,359,905) which is brought into frictional contact with the input shaft when the reverse speed is engaged and remains in contact with this shaft throughout the engagement of this reverse speed. This permanent frictional contact is obviously a very serious drawback.

An object of the present invention is to ensure the braking of the input moving part of the gearbox by means of a particularly simple and reliable device which does not have the drawbacks of the aforementioned prior arrangements.

According to the invention, there is provided a gearbox having at least one non-synchronized speed and comprising, in particular, an input shaft, a mechanism for selecting and engaging the different speeds and in particular the non-synchronized speed, and a pivotal lever carrying a braking surface which is brought into contact with the input shaft prior to the engagement of the non-synchronized speed, wherein there is provided an intermediate member which is driven by the selecting and engaging mechanism when the non-synchronized speed is engaged and acts on the pivotal lever so as to cause the temporary engagement and the disengagement of the braking surface before the non-synchronized speed is engaged.

Other important features are:

the intermediate member is a sliding rod which carries means for actuating the lever;

a spring biases the lever towards the braking position thereof and said lever bears against the intermediate member which has a recess, slot or the like which allows the displacement of the lever when the intermediate member passes through a given position;

the braking surface is such that when the lever is in the braking position, straight lines through the point of contact between said surface and the input shaft and, on one hand, the axis of the input shaft and, on the other hand, the pivot axis of the lever, make an obtuse angle therebetween which tends to open under the effect of the rotation of the input shaft and thereby accentuates the braking effect and the force with which the lever bears on the intermediate member;

the lever is pivotable about a shaft carrying one of the gear pinions employed in the establishment of the non-synchronized speed.

The invention will now be described hereinafter with reference to the accompanying drawings in which:

FIGS. 1 and 3 are perspective views, with parts cut away, of an embodiment of the invention in two successive stages of its operation;

FIGS. 2 and 4 are two partial sectional views corresponding to FIGS. 1 and 3 respectively, and FIG. 5 is a partial sectional view of a modification.

Figure 1:
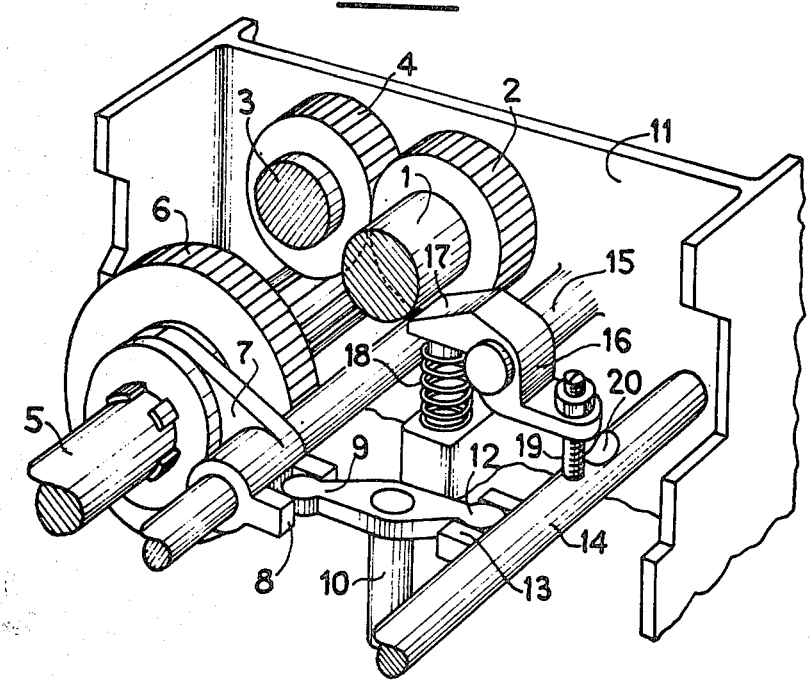

Only the parts needed for the description and understanding of the invention have been shown. There are shown, in particular in FIGS. 1 to 4, the component parts of a gearbox which establishes a non-synchronized reverse speed or ratio, namely an input shaft 1 carrying a driving gear pinion 2, an intermediate shaft 3 carrying a freely rotatable gear pinion 4 and a receiving shaft 5 on which a gear pinion 6 is slidably keyed.

The shafts 1, 3 and 5 are parallel to each other and the pinion 2 is constantly meshed with the pinion 4. The pinion 6 may be driven in translation by a fork member 7 in a block 8 of which there is engaged a finger member 9 which is integral with a selecting shaft 10 which is rotatably and slidably mounted in the conventional manner in the gearbox housing, portions of which have the reference numeral 11.

A second finger member 12, also integral with the shaft 10, is engaged in a block 13 of a rod 14 when the finger member 9 is itself engaged in the block 8 of the fork member 7. The rod 14 is slidably mounted in the housing 11 and, in the illustrated embodiment, is parallel to the axes of the shafts 1, 3 and 5.

Pivotally mounted on a shaft 15, also carried by the housing and parallel to the input shaft 1, is a lever 16 comprising a shoe 17 which is biased by a spring 18 in the direction of the shaft 1. The inclination of the shoe 17 is such that when it presses on the shaft 1 (FIG. 4), the angle a made between a straight line through the point of contact between the shoe 17 and the shaft 1 and the axis of the shaft 15 and a straight line through this point of contact and the axis of the shaft 1 is obtuse and preferably very open and tends to open still more under the driving effect of the rotation of the shaft 1 in the direction of arrow A so long as the shaft 1 is not stopped.

Disposed at the other end of the lever 16 is an adjustable screw which the springs 18 maintains against the rod 14. The latter has a recess 20 which, upon movement for engaging the reverse speed, passes from one side of the screw 19 to the other.

Figure 2:
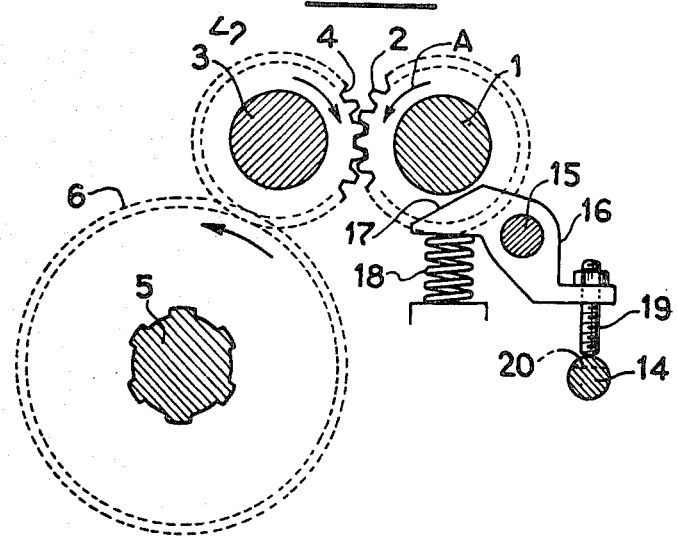

The device just described operates in the following manner:

When the gearbox is in its neutral position or when a forward speed or ratio is engaged, the situation is as shown in FIGS. 1 and 2: the pinion 6 is distinctly disengaged from the pinion 4 and the screw 19 bears against the rod 14 outside the recess 20, namely to the left of this recess as viewed in FIG. 1, so that the shoe 17 does not touch the shaft 1.

To engage the reverse speed, the finger member 9 is first brought, by translation of the shaft 10 in a direction parallel to the latter, to the region of the block 8 which shifts the finger member 12 in the region of the block 13, then the rotation of the shaft 10 urges the pinion 6 towards the pinion 4.

This movement drives the rod 14 in the direction of arrow B (FIG. 3) and before the start of the interengagement of the teeth of the pinions 6 and 4, the recess 2 arrives in the region of the screw 19 as shown in FIGS. 3 and 4.

In this position and under the effect of the thrust exerted by the spring 18, the shoe 17 presses against the shaft 1 and brakes it. Owing to the inclination of the surface of the shoe 17, so long as the shaft 1 rotates, there is produced an engaging effect which tends to increase the frictional contact and therefore to produce a particularly effective braking. But, in addition, the same effect reinforces the pressure of the screw 19 in the bottom of the recess 20 which renders further movement of the rod 14 very difficult so long as the shaft 1 is not stopped. This result is of particular interest and constitutes a marked advantage over known drvices.

When the shaft 1 has been immobilized, the movement can be continued easily until the complete engagement of the teeth of the pinions 6 and 4, the screw 19, in leaving recess 20, releasing the shaft 1 from the thrust of the shoe 17.

It must be understood that the invention is not intended to be limited to the embodiment just described. In particular the following modifications may be envisaged:

The sliding pinion is placed in the known manner on the intermediate shaft and the pinion of the receiving shaft is fixed in translation.

The sliding pinion is not driven directly by a finger member of the selecting shaft but in the known manner through a sliding rod. In this case, it is the rod which may be associated with the lever for braking the input shaft.

The shaft carrying the braking lever 16 may be constituted by the intermediate shaft 3, as shown diagrammatically in FIG. 5.

Having now described my invention what I claim as new and desire to secure by Letters Patent is:

1. A gearbox comprising in combination, a housing, a plurality of gear means supported by the housing for producing different speed ratios of the gearbox, one of said gear means being non-synchronized gear means comprising a first gear member and a second gear member which members are relatively movable between a mutually engaged position for achieving the corresponding gear ratio and a mutually disengaged position, means supported by the housing for selecting and achieving engagement of said gear means including said non-synchronized gear means, an input shaft supported by the housing and being part of said plurality of gear means, a lever supported by the housing, means defining a braking surface and carried by the lever, the lever being pivotable between an inoperative position in which the braking surface is out of contact with the input shaft and an operative position in which the braking surface is in braking contact with the input shaft, means for shifting the lever between said inoperative and operative positions and comprising a slidable rod parallel to the input shaft and movably supported by the housing, means combining the rod with the selecting and engagement achieving means for the non-synchronized gear means for shifting the rod between a first position in which said gear members are in said mutually disengaged poisition and a second position in which said gear members are in said mutually engaged position, said rod having an intermediate position between said first and second positions which corresponds to an intermediate relative position of said first gear member and second gear member in which said gear members are not yet in mutual engagement, and camming means interposed between the rod and the lever for shifting the lever to said inoperative position when the rod is in either of said first and second positions and for shifting the lever to said operative position when the rod is in said intermediate position of the rod.

2. The gearbox claimed in claim 1, wherein said slidable rod is part of said selecting and engagement achieving means.

3. The gearbox claimed in claim 1, comprising a spring biasing the lever towards said operative position thereof, the intermediate member defining a cavity which allows the pivoting of the lever to said operative position when the intermediate member passes through said intermediate position.

4. The gearbox claimed in claim 3, comprising an adjustable screw carried by the lever and having an end which bears against the intermediate member.

5. The gearbox claimed in claim 3, wherein the lever is pivotable about an axis parallel to the input shaft.

6. The gearbox claimed in claim 5, comprising a shaft on which the lever is pivotally mounted and which carries one of said first and second gear members.

7. The gearbox claimed in claim 1, wherein the lever bears on the intermediate member when the lever is in said operative position and the intermediate member is in said intermediate position and, when the lever is in said operative position, two straight lines which respectively join a point of contact between said braking surface and the input shaft to the axis of the input shaft and to the pivot axis of the lever, make an obtuse angle therebetween which tends to open under the effect of the rotation of the input shaft and thus accentuates the braking effect and the force with which the lever bears on the intermediate member.

8. The gearbox claimed in claim 1, wherein the braking surface is defined on an inclined shoe integral with the lever.

* * * * *